March 31, 1953 — M. V. VANNAS — 2,633,122
OPHTHALMOSCOPE
Filed June 24, 1949
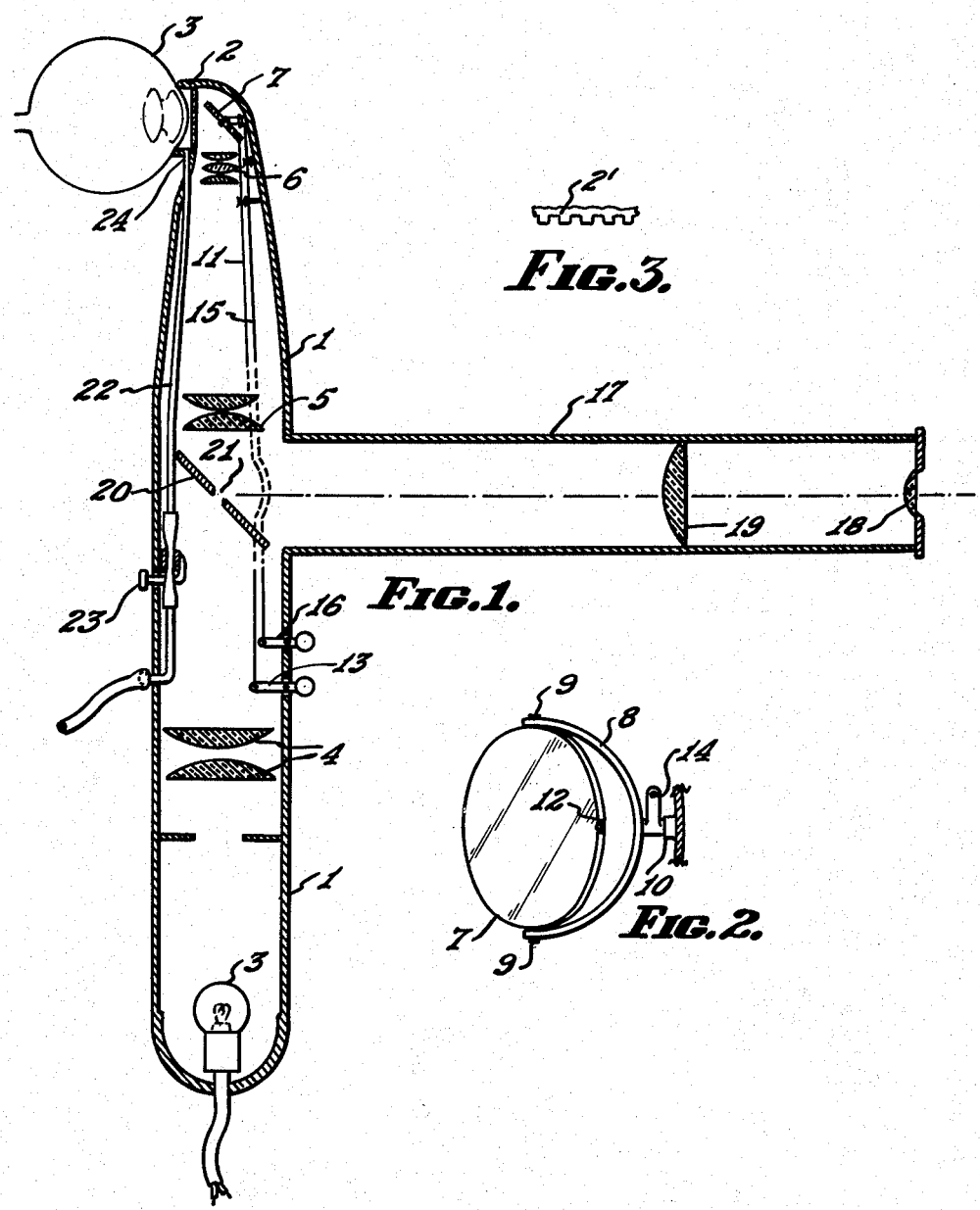
INVENTOR.
MAUNO V. VANNAS,
BY Allen + Allen
ATTORNEYS.

Patented Mar. 31, 1953

2,633,122

UNITED STATES PATENT OFFICE 2,633,122

OPHTHALMOSCOPE

Mauno V. Vannas, Helsinki, Finland

Application June 24, 1949, Serial No. 101,139

4 Claims. (Cl. 128—6)

My invention relates to an ophthalmoscope for examining and viewing the interior of the eye ball of a subject.

To the best of my knowledge all ophthalmoscopes previously used have depended on a complement of lenses held at a distance from the cornea of the eye being examined. This spacing of the ophthalmoscope from the eye limits the angle of view and does not permit the use of such an ophthalmoscope for examination when the eye is turned so that the cornea comes under the eyelid or canthus.

It is an object of my invention to provide an ophthalmoscope which has an objective through which the interior of the eye ball is examined and which rests against, or in some cases, is spaced slightly from the eye ball of the subject. This permits a much wider angle of view than with the usual type of ophthalmoscope.

It is a further object of my invention to provide an ophthalmoscope which enables the operator to operate and at the same time investigate the eye of the subject simultaneously even though the globe of the eye is turned so that the cornea is covered by the eye lid or canthus.

It is a further object of my invention to provide an ophthalmoscope which contacts the eye ball and cuts out extraneous light, so that the eye of a subject may be examined without the necessity of dimming the light in the room.

It is a further object of my invention to provide an ophthalmoscope with all of the above features and advantages which is so proportioned and configured as to be easily placed in position against the eye of a subject and wherein the ocular or viewing portion projects outwardly from the body of the main portion so as to be easily available and capable of supporting a binocular, if desirable, or a microscope, refractometer, camera, gonioscope, or slit lamp, as the case may be.

It is a further object of my invention to provide a self-contained, self-luminous ophthalmoscope which may also be provided with an irrigation duct for irrigating or bathing the eye of the subject.

These and other objects of my invention which will be set forth hereinafter or will be apparent to one skilled in the art upon reading these specifications, I accomplish by that certain construction and arrangement of parts of which I shall now describe an exemplary embodiment.

Reference is now made to the drawings which form a part hereof and in which:

Figure 1 is an enlarged longitudinal section of my ophthalmoscope.

Figure 2 is an enlarged view of a modified terminal mirror placed near the end portion of my ophthalmoscope.

Figure 3 is a side elevation of the edge of a modified objective.

In the drawings, the figures are enlarged for clarity since the finished instrument is not usually as large as shown and the ocular is not as long as shown in Figure 1 of the drawing.

Briefly, in the practice of my invention, I provide an ophthalmoscope with an objective which may be easily sterilized and which is adapted to contact the eye ball of the subject. The surface of contact with the eye may be an open annular aperture having a smoother edge or with a toothed periphery so as to avoid a hermetic seal with the eye ball. Preferably, the aperture is closed with a transparent medium which may consist of an optical flat or a concave or convex optically neutral sheet.

The objective may be of such a size as to rest upon the cornea or sclera of the eye, since my experiments have shown that undesirable pressure on the cornea is avoided with this method.

In some instances, it may be desirable to place a supplemental contact lens upon the eye ball and then place the objective aperture of the ophthalmoscope over this lens. In my preferred form, I avoid a hermetic seal between the objective and the eye ball so as to permit irrigation of the cornea and I also prefer to close the objective aperture with a transparent optically neutral sheet.

The body of the ophthalmoscope can be held in any position when in use and the objective resting on the cornea will shade and cut out extraneous light from the interior of the eye ball.

In the base of the main body is a source of light which is directed by means of an optical system to a fixed or adjustable mirror positioned at the other end of the main body behind the objective aperture. In this way, by moving the ophthalmoscope slightly, the interior of the eye ball is illuminated.

The ocular for viewing the interior of the eye-ball projects outwardly from the main body of the ophthalmoscope and at substantially right angles thereto, its position in use depending, of course, on the position of the cornea of the sitting or lying subject.

It is possible to mount different instruments such as binoculars, refratometers, a gonioscope, a slit lamp, a camera, or the like on the end of the ocular.

The line of vision of the operator through the ocular is reflected toward the objective by a mirror and finally reflected into the interior of the eye ball by means of the fixed or adjustable mirror. This permits, with relatively small movement of the ophthalmoscope, the comfortable and easy inspection of the interior of the eye ball of the subject without the necessity of dimming the lights in the room.

Referring to the drawing, I provide a substantially cylindrical main case or body 1 which is terminated by the objective aperture 2. This objective aperture 2 preferably rests against the cornea (or sclera) of the eye ball 3.

In the lower end of the body 1, I provide the lamp 3 and an optical system composed of condensing lenses 4 and objective lenses 5 and 6 to direct the illumination from the lamp 3 onto the mirror 7. The mirror 7 may be fixed or adjustable as shown in Figure 2, and if adjustable, it is mounted on the semi-circular frame 8 by means of the pintles 9 for rotation. The frame 8 is mounted on a journal 10 so the mirror may be revolved about the journal 10. A stiff wire 11 is attached to the mirror at 12 and runs down through the body 1 where it is attached to the control arm 13. By actuating the control arm 13, the mirror 7 may be tilted in a vertical plane. An arm 14 projects from the frame 8 and has attached to its end a second stiff wire 15 which runs down through the body 1 and is attached to the end of the control lever 16. By manipulating the control lever 16, the mirror 7 may be rotated about the bracket 10.

From the above, it is apparent that the operator by manipulating levers 13 and 16 may direct the light from the source 3 into the interior of the eye ball.

Ordinarily, the mirror 7 need not be adjustable but can be fixed in the end of the body 1 since the manual manipulation of the ophthalmoscope will be sufficient to direct the beam of light into the interior of the eye ball.

The ocular to which the eye of the operator is applied consists of a tube-like housing 17 which is attached to and projects from the main body portion 1 at substantially a right angle. A series of exchangeable and adjustable lenses 18 and 19 are held within the housing 17 and a sloping mirror 20 is positioned at a 45° angle to the line of sight through the ocular and within the main body 1. The mirror 20 has a hole or transparent window 21 in its center to permit passage of the light rays from the source 3 up through the body tube 1 to the mirror 7. The operators' line of sight through the tube 17 is reflected by the mirror 20 up through the lenses 5 and 6 permitting him to view the interior of the eye ball by means of the mirror 7.

From the above, it is apparent that the operator may look through the ocular and view and study the interior of the eye ball which is illuminated by the source of light 3. It is also apparent that the adjustable lenses 18 and 19 in the ocular may be changed, as desired. Or, that different devices such as a microscope, a camera, a binocular, a gonioscope, or the like may be placed on the ocular tube 17 as to perform their individual functions.

Within or along the outside of my body 1, I provide an irrigation passageway 22 which terminates within the objective aperture 2 and between the eye ball and the aperture closure. The irrigation passage is controlled by the pinch valve 23 which is operated by the fingers. When it is desirable to irrigate the surface of the eye ball and the valve 23 is opened, the fluid passing through the passageway 22 will discharge from its open end 24 onto the surface of the eye ball. In this case it is usually desirable to form the edge of the objective aperture 2 of a series of teeth 2' (see Figure 3) so as to permit the fluid after flowing over the surface of the eye ball to flow between the ophthalmoscope and the eye of the subject.

From the above, it is apparent that I have provided an ophthalmoscope which may be used in a brilliantly lighted room, but which will permit the operator to easily inspect the interior of th subject's eye ball. Since the objective of the ophthalmoscope is in contact or substantial contact with the cornea of the eye of the subject, it may be turned slightly on the surface of the eye ball or the mirror 7 may be adjusted for clear inspection. If the ball of the eye is or must be turned so that the eye lid is covering the cornea, the objective end of the ophthalmoscope may be slid under the lid, thus permitting an inspection of the interior with the eye ball in this position. This feature is particularly desirable when operating upon the eye in cases of detached retina, tumor, or foreign bodies in the posterior parts of the eye.

It is also apparent that I have provided a compact, completely adjustable, and conveniently usable ophthalmoscope.

It is to be understood that different forms of my preferred form may be made without departing from the spirit of my invention. Having thus described my invention, what I claim as new and desire to secure by Letters Patent is:

1. An ophthalmoscope comprising a light impervious tubular casing terminating at one end in a tubular terminal member having a closed end and an objective aperture in its side adjacent said closed end, said terminal member being of a size and shape to be wholly slid under the eye lid of a subject to thereby align the aperture with the cornea of the eye, a light source at the opposite end of said tubular casing, a tubular housing opening into said tubular casing intermediate the ends thereof and projecting outwardly from the wall of said tubular casing on the side opposite said aperture, and an optical system comprising a first mirror in said terminal member adjacent said aperture, a second mirror in said tubular casing adjacent the opening of said housing, said second mirror having an opening therein for the passage of light from said light source, focusing lenses in said casing between said first and second mirrors, and a viewing ocular in said housing, and condensing lenses for said light source in said casing between said light source and said second mirror, whereby light from said light source will be directed through said aperture and an image of a portion of the eye will be transmitted from said aperture to said viewing ocular.

2. The ophthalmoscope claimed in claim 1 wherein the edge of said objective aperture is toothed.

3. The ophthalmoscope claimed in claim 1 wherein the edge of said objective aperture is toothed and wherein liquid discharging means is connected therewith.

4. The ophthalmoscope claimed in claim 1 wherein said first mirror is movably mounted and wherein control means are provided on said casing for controlling the movement of said first mirror.

MAUNO V. VANNAS.

REFERENCES CITED

The following references are of record in the file of this patent:

UNITED STATES PATENTS

| Number | Name | Date |
|---|---|---|
| 1,121,667 | Ross | Dec. 22, 1914 |
| 1,235,170 | Thorner | July 31, 1917 |
| 1,528,192 | Brierton | Mar. 3, 1925 |
| 1,548,780 | Herbert | Aug. 4, 1925 |
| 1,605,725 | Herbert | Nov. 2, 1926 |
| 1,806,318 | Tillyer | May 19, 1931 |
| 1,961,309 | Thorner | June 5, 1934 |
| 2,430,851 | Allen | Nov. 18, 1947 |
| 2,448,140 | Bonaventura | Aug. 31, 1948 |
| 2,489,902 | Kough | Nov. 29, 1949 |
| 2,524,720 | Watrous | Oct. 3, 1950 |

FOREIGN PATENTS

| Number | Country | Date |
|---|---|---|
| 23,821 | Great Britain | Nov. 6, 1902 |
| 317,044 | Germany | Dec. 11, 1919 |
| 515,133 | Great Britain | Nov. 27, 1939 |